(No Model.)

S. & R. DAY.
VEHICLE WHEEL.

No. 284,724. Patented Sept. 11, 1883.

Witnesses;
H. W. Wells.
Richd. A. Goldsbrough.

Inventors;
Samuel Day,
and
Reason Day,
per A. B. Upham,
Attorney in fact.

UNITED STATES PATENT OFFICE.

SAMUEL DAY AND REASON DAY, OF DELAVAN, ILLINOIS.

VEHICLE-WHEEL.

SPECIFICATION forming part of Letters Patent No. 284,724, dated September 11, 1883.

Application filed August 14, 1882. (No model.)

*To all whom it may concern:*

Be it known that we, SAMUEL DAY and REASON DAY, of Delavan, in the county of Tazewell, in the State of Illinois, have invented an Improved Vehicle-Wheel; and we do hereby declare that the following is a full, clear, and exact description thereof, reference being had to the annexed drawings, making a part of this specification, in which like letters of reference refer to like parts, and in which—

Figure 1:
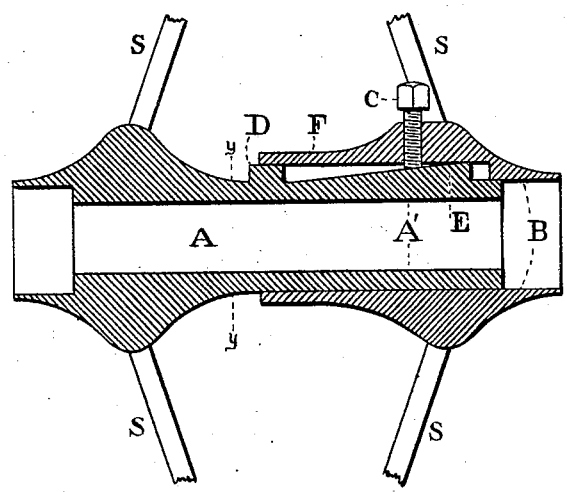
Figure 2:
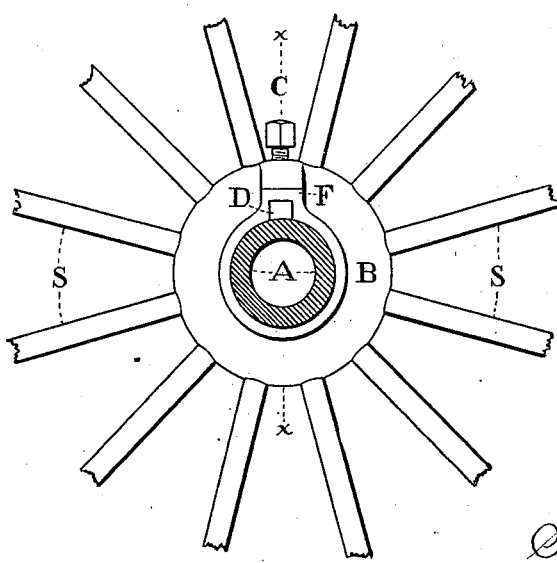

Figure 1 represents a center section through X X; Fig. 2, a sectional view through Y Y.

This invention is in that line of vehicle-wheels in which the hub is made in two parts, capable of adjustment toward each other, for the purpose of pressing together the inner ends of the spokes, one half of which are inserted in one part of said hub and the other half in the other part of the hub. The part of the hub A has an extended stem, A', upon which are two projections, D and E. The other part of the hub B is fitted to slip on over the stem A', and is recessed at F to receive the projections D and E. The projection E is made wedge-shaped, sloping downward away from the end of the stem A', for the purpose of enabling the set-screw C to hold more firmly and surely the hub B upon the stem A'. The object of the projection D is to fill up the entrance of the recess F of the hub B. The projection E terminates at a sufficient distance from the end of the stem A' to allow the recess F to end upon the said stem A'. This arrangement and the projection D are for the purpose of preventing the entrance of sand or gravel into the said cavity F.

In constructing our vehicle-wheel, the two parts A and B composing the hub are cast almost entirely as they are. The only finishing up which they require before they are ready to be used in the construction of a wheel is to bore the holes for the reception of the ends of the spokes S, and to drill and tap the hole for the set-screw C in the hub B. The spokes are of rod-iron, and are all cut of the required length, which is the same for each.

In putting this wheel together, the hub A is placed upon a short spindle, with the stem part up, one-half of the spokes put in place therein, the tire placed in position about them, and the hub B slipped down over the stem A'. The remaining spokes are now slipped into place in the hub B and into the tire, and a sufficiently strong downward pressure applied to force together the two hubs until every spoke of the wheel is held firmly in place. The set-screw C is then inserted in the bolt-hole made for it in the hub B and screwed in hard against the sloping projection E. On removing the pressure from the hub B the wheel will be found to be all complete and ready for use.

What we claim as our invention, and for which we desire Letters Patent, is as follows, to wit:

1. The hub A, having tubular stem A', upon which are the projections D and E, in combination with the hub B, having recess F and set-screw C, substantially as and for the purpose specified.

2. A hub for wheels, consisting of two detachable portions, each having spoke-sockets, and one of which has a tubular stem having a sloping projection thereon, and the other of which is adapted to slide longitudinally upon said stem, and be held firmly thereon by a set-screw impinging against said sloping projection, substantially as and for the purpose specified.

3. The hub A, having stem A', upon which is the sloping projection E, in combination with the sleeve portion B, having recess F and set-screw C, substantially as and for the purpose set forth.

In testimony that we claim the foregoing invention we have hereunto set our hands this 31st day of July, 1882.

SAMUEL DAY.
REASON DAY.

Witnesses:
JAMES N. HALL,
JOHN CULBERTSON.